United States Patent
Bringer et al.

(10) Patent No.: US 9,710,631 B2
(45) Date of Patent: Jul. 18, 2017

(54) METHOD FOR ENROLLING DATA IN A BASE TO PROTECT SAID DATA

(71) Applicant: MORPHO, Issy-les-Moulineaux (FR)

(72) Inventors: Julien Bringer, Issy les Moulineaux (FR); Herve Chabanne, Issy les Moulineaux (FR)

(73) Assignee: MORPHO, Issy les Moulineaux (FR)

( * ) Notice: Subject to any disclaimer, the term of this patent is extended or adjusted under 35 U.S.C. 154(b) by 0 days.

(21) Appl. No.: 14/665,955

(22) Filed: Mar. 23, 2015

(65) Prior Publication Data
US 2015/0269394 A1    Sep. 24, 2015

(30) Foreign Application Priority Data
Mar. 24, 2014 (FR) .................................... 14 52444

(51) Int. Cl.
| | |
|---|---|
| H04L 29/06 | (2006.01) |
| G06F 21/32 | (2013.01) |
| G06F 21/12 | (2013.01) |
| H04L 9/32 | (2006.01) |
| G06K 9/00 | (2006.01) |

(52) U.S. Cl.
CPC ............ *G06F 21/32* (2013.01); *G06F 21/125* (2013.01); *H04L 9/3231* (2013.01); *H04L 63/0861* (2013.01); *G06K 9/0061* (2013.01); *G06K 9/00617* (2013.01); *G06K 2009/00953* (2013.01)

(58) Field of Classification Search
None
See application file for complete search history.

(56) References Cited

U.S. PATENT DOCUMENTS

| | | | |
|---|---|---|---|
| 7,237,115 B1* | 6/2007 | Thomas | H04L 9/32 713/168 |
| 2006/0140401 A1* | 6/2006 | Johnson | G06F 21/14 380/44 |
| 2009/0022374 A1* | 1/2009 | Boult | G06K 9/00885 382/119 |

(Continued)

OTHER PUBLICATIONS

Atallah, Mikhail J., et al. "Secure Biometric Authentication for Weak Computational Devices," Financial Cryptography and Data Security: 9th International Conference, FC 2005, Roseau, The Commonwealth of Dominica, (Aug. 2, 2005), 357-371 (15 pages).*

(Continued)

*Primary Examiner* — Hadi Armouche
*Assistant Examiner* — Andrew Steinle
(74) *Attorney, Agent, or Firm* — Blakely Sokoloff Taylor & Zafman LLP

(57) ABSTRACT

An enrollment method for enrolling biometric data in a database. Each data item includes an information vector on a biometric feature, and a mask vector, determining those bits of the information vector to be taken into account for data comparison. The method includes the application of permutation to the bits of the vectors. The vectors using an enrollment code, the permutation being applied to the encoded vectors. In the encoded vectors, the mean weight of the representations of all the bits of the mask vector is constant or statistically constant irrespective of the values of the bits of the mask vector; and least one bit is drawn randomly following the same law of distribution as the bits of the information vector.

14 Claims, 2 Drawing Sheets

(56) References Cited

U.S. PATENT DOCUMENTS

| | | | | |
|---|---|---|---|---|
| 2011/0047377 A1* | 2/2011 | Allen | ............... | H04L 9/0866 |
| | | | | 713/168 |
| 2011/0185176 A1* | 7/2011 | Takahashi | ............... | G06F 21/32 |
| | | | | 713/168 |
| 2013/0004033 A1* | 1/2013 | Trugenberger | ......... | G06F 21/32 |
| | | | | 382/125 |
| 2015/0334100 A1* | 11/2015 | Isshiki | ............... | H04L 9/065 |
| | | | | 726/6 |

OTHER PUBLICATIONS

Bringer, Julien, et al. "An Application of the Naccache-Stern Knapsack Cryptosystem to Biometric Authentication," 2007 IEEE Workshop on Automatic Identification Advanced Technologies, (Jun. 1, 2007), 180-185 (6 pages).*

Wilber, Michael J., et al. "PRIVV: Private remote iris-authentication with Vaulted Verification," Computer Vision and Pattern Recognition Workshops (CVPRW), 2012 IEEE Computer Society Conference on IEEE, (Jun. 16, 2012), 97-104 (8 pages).*

\* cited by examiner

METHOD FOR ENROLLING DATA IN A BASE TO PROTECT SAID DATA

FIELD OF THE INVENTION

The field of the invention relates to methods for enrolling data, in particular biometric data, in a database, guaranteeing the securing of data once enrolled in the base, and to databases comprising such data.

The invention particularly applies to the enrolment of irises biometric data.

STATE OF THE ART

A biometric datum, in particular of the iris or a vein, generally comprises two binary vectors of identical size; a first so-called information vector contains information on a biometric feature acquired in a person. The second so-called mask vector contains information for determining whether or not corresponding parts of the information vector should be taken into account to perform data comparison.

For example, if the biometric datum concerns an iris image, the information vector is generated for example by acquiring a colour image of the iris, converting this image to grey shades and finally thresholding the grey shades to obtain binary information.

The information vector is organised so that areas adjacent an iris correspond to successive bits in the vector.

The mask vector, which comprises a set of indexed bits corresponding to the bits of the information vector, determines which bits of the information vector are to be taken into consideration for a comparison. For example if part of the iris is masked by an eyelid, irrespective of the value of the bit in the information vector corresponding to this part, the corresponding bit in the mask vector indicates via its value 0 or 1 that it is not to be taken into account.

Such data are stored in a database to carry out identification or authentication of persons by comparing with other biometric data. Comparisons are most often made by calculating the Hamming distance between two data items, which counts the number of different pixels between the two data items.

For data of the aforementioned type, comprising a mask vector, the Hamming distance is written:

$$(i \oplus i') \cap (m \cap m')$$

where i and i' are information vectors of two data items, and m and m' are the mask vectors which comprise bits at 1 for non-hidden areas or areas to be taken into account for comparison, and bits at 0 for areas not to be taken account for comparison (hidden or doubtful areas).

The Hamming distance is therefore calculated taking into consideration only those parts of the information vectors to be taken into account for comparison.

To protect such data stored in databases it has been proposed to apply permutation to the information vector and mask vector, the permutation being the same for both vectors.

This effectively allows preservation of the Hamming distance between two similarly permutated data items.

However, it is possible to detect the permutation used on a biometric data item using the pair x, p(x), where x designates a data item comprising an information vector and a mask vector, and p(x) the permuted data item, or even using a pair x, p(x').

For detection of the applied permutation it is always possible to use the bits at 0 of the mask vector to determine the geographical areas of the iris which are hidden (e.g. by eyelashes or eyelids). It is also possible to make use of the links existing between successive bits of the information vector which correspond to geographical correlations in areas of the iris.

It is therefore necessary to provide further protection for biometric data of the type comprising two vectors: an information vector and a mask vector.

Presentation of the Invention

It is one objective of the invention to propose a method for enrolling biometric data which provides increased security compared with the prior art.

A further objective of the invention is to propose a method for enrolling data in a base, and a method for acquiring a data item to be compared with a data item in the base, which allows calculation of a Hamming distance between the two data items.

In this respect, the subject of the invention is a method for enrolling biometric data in a database, each data item comprising a binary information vector on a biometric feature, and a binary mask vector determining the bits of the information vector to be taken into account for data comparison, the method comprising the application of a permutation to the bits of the information vector and of the mask vector, the method being characterized in that it further comprises a step to encode the vectors using a so-called enrolling code, permutation being performed on the encoded vectors, and the said encoding comprising:

representing each bit of the mask vector in a sequence of several bits, such that the mean weight of the representations of all the bits of the mask vector is constant or statistically constant irrespective of the values of the bits of the mask vector; and representing each bit of the information vector in a sequence comprising at least one bit drawn randomly, the randomly drawn bits following the same law of distribution as the bits of the information vector.

Advantageously, but optionally, the enrolment method of the invention may further comprise at least one of the following characteristics:

the sequence of bits representing the encoding of a bit of the information vector to be taken into account for data comparison comprises at least one randomly drawn bit and the bit of the information vector;

the permutation applied to the encoded vectors is identical, and the position of the bit of the information vector in the sequence of bits representing the encoding of a bit to be taken into account for data comparison corresponds to the position of a bit at 1 in the sequence of bits representing the encoding of a bit of the mask vector;

the position of the bit of the information vector in the sequence of bits representing the encoding of a bit to be taken into account for data comparison does not correspond to the position of a bit at 1 in the sequence of bits representing the encoding of a bit of the mask vector, and the permutation step comprises the application of different permutations to the sequences of bits representing the encoding of the information vector and of the mask vector, the permutations being adapted so that the position of the bit of the information vector after permutation corresponds to a bit at 1 in the sequence of bits of the encoded mask vector after permutation.

the sequence of bits representing the encoding of a bit in the information vector not to be taken into account for data comparison comprises a single bit drawn randomly or randomly drawn bit and the bit of the information vector;

the sequence of bits representing the encoding of a bit (m) of the mask vector comprises a sequence Y of n−1 bits and the bit of the mask vector, the sequence Y of bits possibly having $2^{n-1}$ values $Y_1, \ldots, Y_{2^{(n-1)}}$, and the probability $\alpha_1, \ldots \alpha_{2^{(n-1)}}$ of choosing value $Y_1, \ldots, Y_{2^{(n-1)}}$ when the bit of the mask vector is 0, and probability $b_1, \ldots, b_{2^{(n-1)}}$ of choosing value $Y_1, \ldots, Y_{2^{(n-1)}}$ when the bit of the mask vector is 1 are as follows:

$$\sum_{i=1}^{2^{n-1}} [\text{Weight}(Y_i) * \alpha_i] = \sum_{i=1}^{2^{n-1}} [(\text{Weight}(Y_i) + 1) * \beta_i]$$

the values which can be displayed by the sequence Y of bits are fixed or randomly drawn;

the number of bits at 1 in a sequence of bits representing the encoding of a bit of the mask vector has a statistically constant mean weight of n/2;

the method, after application of permutation, further comprises the multiplication by an invertible matrix of the encoded mask vector.

A further subject of the invention is a database comprising at least one biometric data item enrolled by implementing the enrolment method described in the foregoing presentation.

A still further subject of the invention is a method for acquiring a new biometric data item comprising a binary information vector on a biometric feature, and a binary mask vector determining which bits of the information vector are to be taken into account for comparison, the said data item being acquired for comparison with a data item previously enrolled in a database using the method according to the preceding description, the method comprising the application of permutation to the new biometric data item, the encoding of the new biometric data item by a so-called verification code, the permutation being applied to the encoded data item, and wherein:

the said encoding and permutation are adapted to preserve the value of the Hamming distance or weighted Hamming distance between the new data item and the data item in the base after their respective encoding;

the encoding of the new data item comprises the representation of each bit in the data vectors by a sequence comprising an equal number of bits to the number of bits in the sequences representing the encoded vectors of data contained in the base;

the permutation applied to the new data item is identical to the permutation applied to the data item in the base at the time of its enrolment, and the representation of the bits of the mask vector is also adapted so that solely the intersection of the two sequences of bits representing the bits of the mask vectors corresponding to the areas to be taken into account for comparison is nonzero.

A further subject of the invention is a data processing method comprising the acquisition of a new biometric data item for comparison with a data item enrolled in a database in accordance with the foregoing presentation, comprising the application of permutation to the new biometric data item and the encoding of the new biometric data item by a so-called verification code, the permutation being applied to the encoded data item, the said encoding and permutation being adapted to preserve the value of the Hamming distance or of the weighted Hamming distance between the new data item and the data item in the base after their respective encoding, the method further comprising the comparison of the new encoded biometric data item with the data item enrolled in the base, the said comparison comprising the calculation of a weighted Hamming distance between the new data item encoded by the verification code and the encoded data item in the base.

Advantageously, but optionally, the data processing method of the invention further comprises at least one of the following characteristics:

the new data item comprises a binary information vector on a biometric feature, and a binary mask vector determining those bits of the information vector to be taken into account for comparison, and the encoding of the new data item comprises the representation of each bit of the data vectors by a sequence comprising an equal number of bits to the number of bits in the sequences representing the encoded vectors of the data contained in the base, the permutation applied to the new data item being identical to the permutation applied to the data item in the base at the time of its enrolment, and the representation of the bits of the mask vector also being adapted so that solely the intersection of the two sequences of bits representing the bits of mask vectors corresponding to areas to be taken into account for comparison is nonzero;

the biometric data item enrolled in the database was enrolled using the method in the preceding description which, after application of permutation, comprises the multiplication of the encoded mask vector by an invertible matrix, and the comparison comprises:

the generation of an inverse matrix of the invertible matrix multiplied with the mask vector at the time of enrolment of the data item in the base;

multiplication by the inverse matrix of the sequence of bits representing the encoded mask vector of the data item in the base; and calculation of a weighted Hamming distance between the new data item encoded by the verification code and the encoded data item in the base obtained after multiplication.

A final subject of the invention is a system comprising a database in accordance with the foregoing description and at least one management server for the database comprising processing means adapted to apply, to a data item comprising two binary vectors, an enrolment encoding method comprising:

the representation of each bit of the mask vector in a sequence of several bits, such that the mean weight of the representations of all the bits of the mask vector is constant irrespective of the values of the bits of the mask vector, and the representation of each bit of the information vector in a sequence comprising at least one bit drawn randomly, the randomly drawn bits following the same law of distribution as the bits of the information vector.

The proposed enrolment method allows increased security of data enrolled in a database since the encoding balances the distribution of the bits of a mask vector so as not to reveal, through the position of the 0 or 1 bits, the position of a characteristic point of the biometric data item such as an eyelid for example for an image of an iris.

The enrolment encoding also allows deletion of the links between successive bits of the information vector by adding a random component in the encoded representation of this vector.

The fact that the same law of distribution is maintained as for the information vector means that the random components are undetectable.

The proposed acquisition method also allows the comparison of a new data item with a data item previously enrolled in the base using the above-described method, by calculating a Hamming distance or weighted Hamming distance between these data items and by adapting the verification encoding to the enrolment encoding.

DESCRIPTION OF THE FIGURES

Other characteristics, objectives and advantages of the present invention will become apparent on reading the following detailed description in connection with the appended Figures given as non-limiting examples and in which.

DETAILED DESCRIPTION OF AT LEAST ONE EMBODIMENT

Data Storage System

Figure 1:
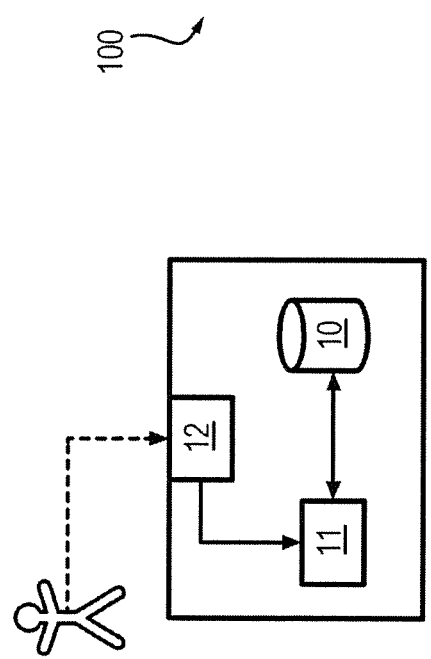
FIG. 1 schematically illustrates a system comprising a database.

With reference to FIG. 1, a system 1 is illustrated comprising a database 10 in which digital data are recorded, or enrolled, in the form of sequences of bits also called binary vectors in the remainder hereof.

The data are advantageously biometric data e.g. images of an iris or of vein networks.

Each data item comprises two binary vectors: a first so-called information vector I containing data on a biometric feature acquired in a person, and the second so-called mask vector M containing information on whether or not corresponding parts in the information vector are to be taken into account to perform data comparison.

According to a first embodiment the two binary vectors, I and M, are of identical size. Therefore each vector I, M comprises a sequence of indexed bits i, m respectively and the value of a bit m in the mask vector M indicates whether or not the bit i of same index in the information vector I is to be taken into account for data comparison.

As a variant the two vectors, I and M, may be of different sizes. For example a geographical position of a biometric feature may be represented by several bits i of the information vector I and by a single bit m of the mask vector.

In the following example it is considered that a bit at 1 in the mask vector M indicates one or more bits to be taken into account in the information vector I, and a bit at 0 indicates one or more bits not to be taken into account in the information vector I. For the image of an iris this may be an area hidden by an eyelid or eyelashes.

The system 1 further comprises a server 11 to manage the base, adapted to read and write access the database 10 and which comprises processing means e.g. a processor allowing implementation of the enrolment described below and, when applicable, the acquisition of a new data item and comparison of this data item with a data item in the base.

If the database 10 is used to store biometric data, this base 10 is therefore used to conduct biometric authentications or identifications of persons using biometric data acquired in the person and compared with data in the base.

The system 1 further comprises a biometric data sensor 12 selected in relation to the biometric feature to be captured.

This sensor 12 can be used to acquire a data item to be enrolled in the database 10 or to acquire a new data item to be compared with a data item in the base for authentication or identification.

Presentation of the Enrolment Method

Figure 2:
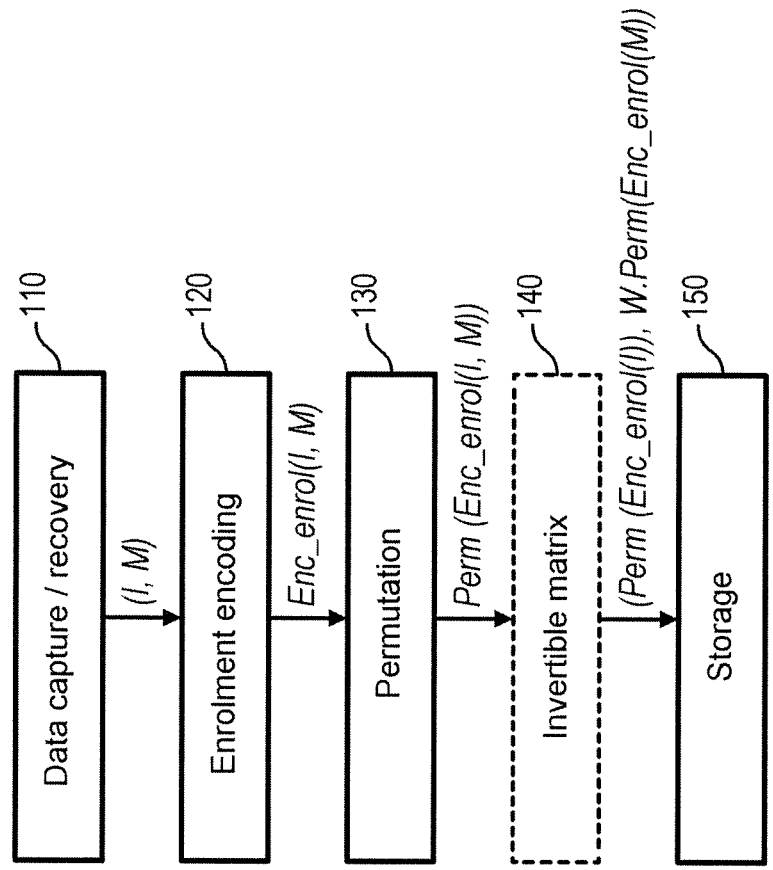
FIG. 2 illustrates the main steps of a method for enrolling data in a database.

With reference to FIG. 2 a description is now given of a method 100 for enrolling a data item in the base 10.

At a first step 110 of this method, a data item is obtained that is to be enrolled in the base 10. This step can be implemented by capturing a data item in a person using the sensor 12, or by recovering a data item from another medium. For example, this data item could be available on a network to which the management server 11 has access, or in a person's identity document etc.

The data item thus recovered comprises the two binary vectors I and M described in the foregoing.

This data item is then encoded 120 by a first so-called enrolment code enc_enrol. This step is preferably carried out by the management server 11 and is described in more detail below.

As described below the method then comprises the application of permutation 130, adapted to the encoding and preferably identical, to the encoded representations of the information and mask vectors.

Optionally, the management server may also multiply the encoded, permuted mask vector by an invertible matrix W drawn randomly at step 140, allowing the transformation of the vectors to be made more complex and making it more difficult to find the starting data.

Finally, at step 150, the management server 11 records the encoded data item in the database.

Enrolment Encoding

Returning to enrolment encoding step 120, this encoding is applied to the two binary vectors I, M in different manners.

The enrolment encoding enc_enrol applied to the mask vector M comprises the representation of each bit m of the vector by a sequence of bits comprising at least two bits, the sequences of bits representing the encoded bits of the mask vector having a constant or statistically constant mean weight over the entire encoding of the mask vector irrespective of the values of the bits of the mask vector.

By statistically constant mean weight it is meant that the mean weight of the sequences of bits over the entire encoding of the mask vector M tends towards a fixed value.

Advantageously the sequence of bits representing the encoding of a bit m of the mask vector comprises n bits, of which the n−1 first bits form a vector $Y=y_1\|\ldots\|y_{n-1}$ and the last is the bit of the mask vector.

The vector Y can be determined and fixed by associating therewith a value for m=0 and another value for m=1, or drawn randomly but paying heed to the constraint that the number of bits at 1 (and hence at 0) in Y∥m is constant on average in the encoded representation of the mask vector M, whether m equals 0 or 1.

This condition can be met if the possible values of the vector Y are written $Y_1, \ldots, Y_{2^{(n-1)}}$, by associating a probability $\alpha_i$ that the value $Y_i$ is taken to be m=0, and a probability $\beta_i$ that this value is taken to be m=1, the probabilities $\alpha_i$ and $\beta_i$ having the following constraints:

$$\sum_{i=1}^{2^{n-1}} [\text{Weight}(Y_i) * \alpha_i] = \sum_{i=1}^{2^{n-1}} [(\text{Weight}((Y_i)) + 1) * \beta_i]$$

The weight of a sequence of bits is the Hamming weight i.e. the number of bits at 1 in the sequence.

This condition is equivalent to the following condition (which is therefore heeded if the first condition is met):

$$\sum_{i=1}^{2^{n-1}} [n - \text{Weight}(Y_i) * \alpha_i] = \sum_{i=1}^{2^{n-1}} [n - 1 - \text{Weight}((Y_i)) * \beta_i]$$

The proposed encoding makes it possible to render a "masked" position i.e. corresponding to a bit of the information vector not to be taken into account for comparison, non-distinguishable from a "non masked" position when considering a bit separately.

If the mask vector is not encoded, it is sufficient to examine the values of the bits to obtain information on the areas to be taken into account and not to be taken into account for comparison between two data items.

However, once the mask vector is encoded and permutation applied to the bits of the representation of the vector, it is not possible when considering a bit on its own to say whether or not this bit originates from the representation of a bit at 1 or a bit at 0 in the mask vector.

For example the encoding of the mask vector can be performed as follows:

Mask bit=0→10 (Y=1)
Mask bit=1→01 (Y=0)

Alternatively, when the bits of the mask vector are encoded in sequences of three bits, the encoding may comprise the representation of a bit at 0 at 110, 100, 010 or 000, and respectively the representation of a bit at 1 at 111, 101, 011 or 001.

This gives: $Y_1=11$, $Y_2=10$, $Y_3=01$ and $Y_4=00$.

It is possible for example to choose the probabilities $\alpha_i$ and $\beta_i$ as follows: $\alpha_1=\beta_4$ 5/8 and $\alpha_2=\alpha_3=\alpha_4=\beta_1=\beta_2=\beta_3=\frac{1}{8}$.

The higher the number of bits in a Y sequence the more secure the encoding of the data.

An additional condition allowing further increased protection of encoded data in the base is that, for all the encoded representations of the bits of the mask vector, the weight of the representations Y||m is fixed on average at n/2 (where n is the length of the sequence of bits representing the encoding of a bit) whether m equals 0 or 1. According to the preceding example, the statistically constant mean weight of n/2 is obtained by adapting the probabilities $\alpha_i$ and $\beta_i$ so that the mean weight of the data is statistically equal to n/2.

Regarding the enrolment encoding enc_enrol applied to the information vector, this comprises the representation of a bit of the vector by a sequence of bits comprising at least one bit drawn randomly, but such that the randomly drawn bits follow the same law of distribution as the information vector.

It is thereby possible to delete the correlations between successive bits of the information vector, so as to eliminate the possibility of extracting information therefrom on the encoded data item.

Advantageously the encoding of information vector bits to be taken into account i.e. according to the foregoing example of bits corresponding to bits at 1-position in the mask vector, advantageously comprises at least one bit drawn randomly and the initial bit of the information vector. It is thus possible to preserve the information contained in the information vector for subsequent performing of comparison between two data items by calculating a Hamming distance or weighted Hamming distance, according to one advantageous example of embodiment of the invention, or by calculating another comparison function frequently used in this field.

Advantageously the position of the initial bit of the information vector in the sequence of bits corresponds to the position of a bit at 1 in the sequence of bits representing the encoding of the corresponding bit in the mask vector. It is thereby possible to preserve the information contained in the vector to calculate the Hamming distance and hence to preserve this distance when encoding the data item.

However, a bit of the information vector corresponding to a masked area (hence in the example corresponding to a bit at 0 in the mask vector) may possibly not comprise the initial bit of the vector and may be limited to one or more randomly drawn bits.

Alternatively so as not to make any distinction in the encoding of bits of the information vector, the encoded representation of a bit not to be taken into account for comparison nevertheless contains the initial bit and one or more randomly drawn bits. For example, the preferred embodiment of enrolment encoding of the information vector is adapted to the preceding encoding of the mask vector and comprises the representation of each bit of the information vector by a sequence of bits A||i, where $A=a_1|| \ldots ||a_{(n-1)}$ and i is the bit of the information vector.

The $a_i$ bits are random bits but they respect the distribution of the i bits in the information vector. Therefore, for example, if the probability $P(x=0)=\eta$, then the $a_i$ bits are drawn following the same probability $\eta$ of equaling 0.

To return to the example given previously of sequences of two bits representing the binary vectors, the following encoding is obtained:

Enc_enrol(x, 0)=(ax, 10)
Enc_enrol(x, 1)=(a'x, 01).

where a and a' are bits drawn randomly and following the distribution of the bits of the information vector.

Returning also to the example given previously of sequences of three bits representing the binary vectors, the following encoding is obtained:

Enc_enrol(x, 0)=(abx, 110) or (abx, 100) or (abx, 010) or (abx, 000)
Enc_enrol(x, 1)=(cdx, 111) or (cdx, 101) or (cdx, 011) or (cdx, 001).

Here again, the application of permutation to the encoded representation of the bits of the information vector make it impossible, when considering a bit separately, to obtain any information on the initial bit.

According to an alternative embodiment, the position of the initial bit of the information vector in the sequence of bits does not correspond to the position of a bit at 1 in the sequence of bits representing the encoding of the corresponding bit of the mask vector, but in this case the permutations applied at step 130 to the encoded sequences of bits of the vectors I and M are different and are adapted so that the position of a bit of the information vector, after application of permutation, corresponds to the position of a bit at 1 after permutation of the sequence of bits representing the encoding of the mask vector.

This applies in general whether the bit of the information vector is a bit to be taken into account (mask bit at 1) or not (mask bit at 0).

With this variant it is also possible to maintain the value of the Hamming distance between the data items.

Figure 3:
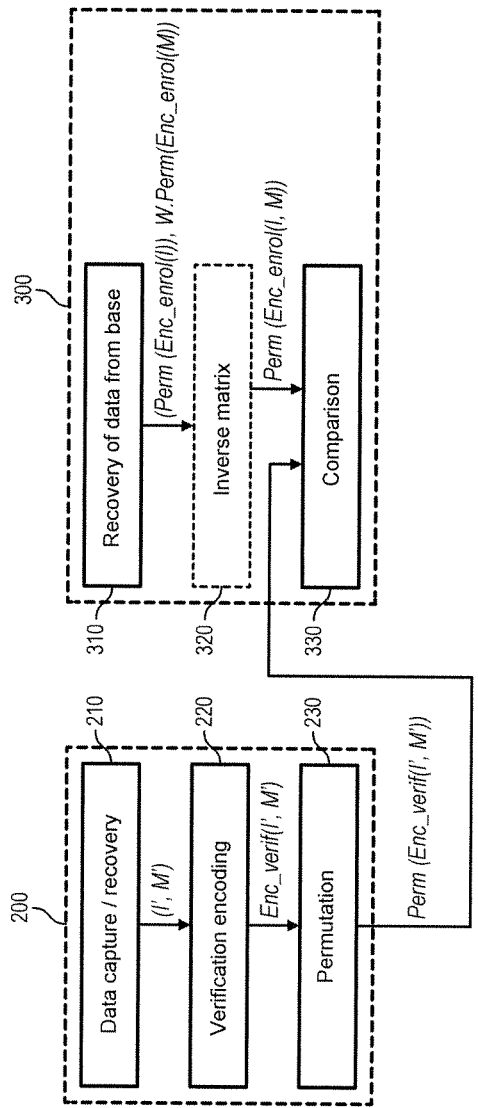
FIG. 3 illustrates the main steps of a method for acquiring a new data item and comparing with a database.

With reference to FIG. 3, a description is now given of a method for acquiring a new data item 200, preferably a biometric data item for comparison thereof with a data item enrolled in the database 10 using the preceding method.

This method is adapted to the foregoing enrolment method to allow calculation of a Hamming distance (including a weighted Hamming distance) on the encoded data items, and hence to preserve the result of this distance between the two data items before and after encoding.

To do so the method 200 comprises a first step 210 to acquire a new data item. This step is advantageously implemented using the sensor 12 by acquiring a biometric feature in a person, which then transfers the data item to the management server 11. Alternatively, this step is performed by recovering a biometric data item from a network or identity document.

The data item obtained, like the data processed by the enrolment method, comprises two vectors of identical size: an information vector and a mask vector. The size of these vectors is also identical to the size of the vectors of the data items processed by the enrolment method 100.

The method 200 then comprises an encoding step 220 to encode the data item thus obtained using a so-called verification code enc_verif, which may differ from the enrolment code and which is adapted to the latter to maintain the Hamming distance between the data items.

In this respect, each encoded representation of a bit of the information vector and of the mask vector comprises the same number of bits as the sequences of bits respectively representing the encoded information and mask vectors of the enrolled data item.

Additionally, the encoding of the bits of the mask vector is adapted so that solely the intersection of bits corresponding to areas of the information vectors to be taken into account for comparison is nonzero.

The weighted Hamming distance is indeed written:

$$\frac{\|(I \oplus I') \cap M \cap M'\|}{\|M \cap M'\|}$$

According to the preceding example wherein the bits at 1 of the mask vectors m, m' correspond to non-hidden areas of a biometric feature, and hence to be taken into account for comparison, and wherein the enrolment encoding of a bit of the mask is written $Y\|m=y_1\| \ldots \|y_{n-1}$, the encoding of a bit m' of the mask vector of the new data item is advantageously $0\| \ldots \|0\|m'$.

To return to the preceding example in which the enrolment encoding is implemented on two bits, the verification encoding enc_verif is therefore as follows:

Mask bit=0→00
Mask bit=1→01

The two initial mask bits must therefore lie at 1 to have a nonzero intersection: 10∩00=00; 10∩01=00, 00∩01=00; 01∩01=01.

Regarding the verification encoding (enc_verif) of the information vector, it is sufficient that the sequences obtained have the same number of bits as the sequences encoded by the enrolment code, and that the representation of a bit corresponding to an area to be taken into account for comparison comprises the said bit at a position facing a bit at 1 in the encoded representation of the corresponding bit of the mask vector.

According to the preceding example wherein the enrolment encoding of an information bit is written $A\|i$, the encoding of an information bit i' of the new data item may be of type $A'\|i$ where $A'=a'_1\| \ldots \|a'_{(n-1)}$ and the $a_i$ bits are randomly drawn.

The following encoding is therefore obtained according to the preceding example:

Enc_verif(x, 0)=(ax, 00)
Enc_enrol(x, 1)=(bx, 01).

It is thereby possible to separate the bits of sequences of bits representing one same initial bit of the information vector and of the mask vector. It is therefore impossible, when examining a bit separately, to infer therefrom the initial value of the bit of which this bit forms part of the encoded sequence.

The method 200 then comprises the application 220 to the encoded representations of the information and mask vectors, by the management server 11, of the same permutation as that applied to the enrolled data items.

This makes possible a subsequent comparison 300 between the acquired data item and a data item in the base by calculating the Hamming distance in the encoded data.

For this purpose the management server 11 of the base recovers 310 a data item recorded in the base in encoded and permuted form.

Optionally, if the enrolment of data in the database 10 comprises the multiplication of the encoded and permuted mask vector by an invertible matrix, the method 200 further comprises the calculation 320 of the inverse matrix of the invertible matrix, and the multiplication by the inverse matrix of the sequence of bits recorded in the base corresponding to the encoded and permuted mask vector.

Finally, the management server 11 performs the comparison 330 between the two data items by calculating the weighted Hamming distance therebetween in accordance with the formula given above.

The proposed method, by encoding and then permuting the mask vector, can therefore render the masked areas indistinguishable from the non-masked areas when bits are examined individually, and by encoding the information vector the method eliminates the links between two successive bits of the information vector.

In addition, the enrolment encoding and verification encoding maintain the value of the Hamming distance at the time of encoding, allowing faster comparison.

The invention claimed is:

1. An enrollment method (100) for enrolling biometric data (I, M) in a database (10), each data item comprising a binary information vector (I) on a biometric feature, and a binary mask vector (M), determining those bits (i) of the information vector to be taken into account for data comparison, the method comprising the application (130) of permutation to the bits of the information vector (I) and of the mask vector (M), the method further comprising a step (120) to encode the vectors using an enrollment code (enc_enrol), the permutation being applied to the encoded vectors, said encoding comprising:

converting each bit (m) of the mask vector (M) into a sequence of several bits representing the encoding of said bit (m) of the mask vector (M), such that a mean weight of the sequences of bits is constant or statistically constant irrespective of the values of the bits (m) of the mask vector; and converting each bit (i) of the information vector (I) into a sequence representing the encoding of said bit (i)

of the information vector (I) and comprising at least one bit drawn randomly (a), the randomly drawn at least one bit following a same law of distribution as the bits of the information vector.

2. The enrollment method (100) according to claim 1, wherein the sequence of bits representing the encoding of a bit (i) of the information vector (I) to be taken into account for data comparison comprises said at least one randomly drawn bit (a) and the bit of the information vector (i).

3. The enrollment method (100) according to claim 2, wherein the permutation applied to the encoded vectors (I) and (M) is identical and the position of the bit (i) of the information vector (I) in the sequence of bits representing the encoding of a bit to be taken into account for data comparison corresponds to the position of a bit at 1 in the sequence of bits representing the encoding of a bit of the mask vector (M).

4. The enrollment method (100) according to claim 2, wherein the position of the bit of the information vector (I) in the sequence of bits representing the encoding of a bit to be taken into account for data comparison does not correspond to the position of a bit at 1 in the sequence of bits representing the encoding of a bit of the mask vector, and the permutation step (130) comprises the application of different permutations to the sequences of bits representing the encoding of the information vector and of the mask vector, the permutations being adapted so that the position of the bit of the information vector after permutation corresponds to a bit at 1 in the sequence of bits of the encoded mask vector after said permutation.

5. The enrollment method (100) according to claim 1, wherein the sequence of bits representing the encoding of a bit (i) of the information vector (I) not to be taken into account for data comparison comprises a single bit drawn randomly or a randomly drawn bit and the bit of the information vector.

6. The enrollment method (100) according to claim 1, wherein the sequence of bits representing the encoding of a bit (m) of the mask vector (M) comprises a sequence Y of n−1 bits and the bit (m) of the mask vector (M), the sequence Y of bits possibly having $2^{n-1}$ values $Y_1, \ldots, Y_{2^{(n-1)}}$, and the probabilities $\alpha_1, \ldots \alpha_{2^{(n-1)}}$ of choosing value $Y_1, \ldots, Y_{2^{(n-1)}}$ when the bit of the mask vector is 0 and $b_1, \ldots, b_{2^{(n-1)}}$ of choosing value $Y_1, \ldots, Y_{2^{(n-1)}}$ when the bit of the mask vector is 1 are as follows:

$$\sum_{i=1}^{2^{n-1}} [\text{Weight}(Y_i) * \alpha_i] = \sum_{i=1}^{2^{n-1}} [(\text{Weight}(Y_i) + 1) * \beta_i].$$

7. The enrollment method according to claim 6, wherein the values ($Y_i$) which may be displayed by the sequence Y of bits are fixed or randomly drawn.

8. The enrollment method (100) according to claim 6, wherein the number of bits at 1 in the sequence of bits (Y‖m) representing the encoding of a bit (m) of the mask vector has a statistically constant mean weight of n/2.

9. The enrollment method (100) according to claim 1, further comprising, after application of the permutation, the multiplication (140) by an inverse matrix (W) of the encoded mask vector.

10. An acquisition method (200) for acquiring a new biometric data item (I', M') comprising a binary information vector (I') on a biometric feature and a binary mask vector (M') determining those bits of the information vector to be taken into account for data comparison, said data item being acquired for comparison thereof with a data item enrolled in a database (10) according to claim 1, the acquisition method comprising the application of permutation (230) to the new biometric data item, an encoding (220) of the new biometric data item by a verification code (enc_verif), the permutation being applied to the encoded data item (enc_verif (I', M')), and wherein:

said encoding and the permutation are adapted to preserve the value of the Hamming distance or weighted Hamming distance between the new data item (I', M') and the data item (I, M) in the base after their respective encoding;

the encoding (220) of the new data item comprises the representation of each bit of the vectors of the data item by a sequence comprising an equal number of bits to the number of bits in the sequences representing the encoded vectors of the data items (I, M) in the base (10);

the permutation applied to the new data item is identical to the permutation applied to the data item in the base (10) at the time of its enrollment, and the representation of the bits of the mask vector is also adapted so that only the intersection of the two sequences of bits representing the bits of mask vectors corresponding to areas to be taken into account for comparison is nonzero.

11. A data processing method comprising the acquisition (200) of a new biometric data item (I', M') for comparison thereof with a data item enrolled in a database (10) using the method according to claim 1, comprising the application of permutation (230) to the new biometric data item, and an encoding (220) of the new biometric data item by a verification code (enc_verif), the permutation being applied to the encoded data item (enc_verif (I', M')), said encoding and the permutation being adapted to preserve the value of the Hamming distance or weighted Hamming distance between the new data item (I', M') and the data item (I, M) in the base after their respective encoding, the method further comprising the comparison (300) of the encoded new biometric data item with the data item enrolled in the base, the said comparison comprising the calculation of a weighted Hamming distance between the new data item encoded by the verification code and the encoded data item in the base.

12. A processing method according to claim 11, wherein the new data item (I', M') comprises a binary information vector (I') on a biometric feature, and a binary mask vector (M') determining those bits of the information vector to be taken into account for comparison, and the encoding (220) of the new data item comprises the representation of each bit of the data vectors by a sequence comprising an equal number of bits to the number of bits in the sequences representing the encoded vectors of data (I, M) in the base (10), the permutation applied to the new data item being identical to the permutation applied to the data item in the base (10) at the time of its enrollment, and the representation of the bits of the mask vector also being adapted so that solely the intersection of the two sequences of bit representing the bits of mask vectors corresponding to areas to be taken into account for comparison is nonzero.

13. The processing method (300) according to claim 11, wherein the enrollment of the biometric data item in the database (10) further comprises, after application of the permutation, the multiplication (140) by an inverse matrix (W) of the encoded mask vector, and wherein the comparison comprises:

the generation of an inverse matrix of the invertible matrix multiplied with the mask vector at the time of enrollment in the database, multiplication (320) by the inverse matrix of the sequence of bits representing the encoded mask vector of the data item in the base, and calculation of a weighted Hamming distance (330) between the new data item encoded by the verification code and the encoded data item of the base obtained after multiplication.

14. A system (1) comprising a database (10) and at least one management server (11) managing the database (10), comprising a processor adapted to apply to a data item (I, M), comprising two binary vectors, an enrollment encoding method (enc_enrol), comprising:

converting each bit (m) of the mask vector (M) into a sequence of several bits, representing the encoding of said bit (m) of the mask vector (M), such that a mean weight of the sequences of bits is constant or statistically constant irrespective of the values of the bits of the mask vector, and converting each bit (i) of the information vector (I) into a sequence representing the encoding of said bit (i) of the information vector (I) and comprising at least one bit drawn randomly, the randomly drawn at least one bit following the same law of distribution as the bits of the information vector.

\* \* \* \* \*